(12) United States Patent
Coto

(10) Patent No.: US 8,601,925 B1
(45) Date of Patent: Dec. 10, 2013

(54) DENTAL PROSTHESIS MOLD SHAPING APPARATUS

(76) Inventor: Rangel Coto, Miami Lakes, FL (US)

( * ) Notice: Subject to any disclaimer, the term of this patent is extended or adjusted under 35 U.S.C. 154(b) by 205 days.

(21) Appl. No.: 13/175,315

(22) Filed: Jul. 1, 2011

(51) Int. Cl.
- *B27B 5/00* (2006.01)
- *B27B 5/04* (2006.01)
- *B23D 19/00* (2006.01)
- *B26D 5/02* (2006.01)
- *B26D 3/00* (2006.01)

(52) U.S. Cl.
USPC ............... 83/452; 83/360; 83/461; 83/471.2

(58) Field of Classification Search
USPC .......... 83/452, 360, 861, 149, 112, 150, 490, 83/473, 485, 581, 397, 461, 347.1, 375, 83/471.2; 433/223; 219/121.72, 121.67; 264/16, 19; D15/127; 144/2.1, 359, 144/364
See application file for complete search history.

(56) References Cited

U.S. PATENT DOCUMENTS

| | | | |
|---|---|---|---|
| 1,697,434 A * | 1/1929 | Moore, Jr. | 83/861 |
| 2,454,427 A | 11/1948 | Bell | |
| 2,614,326 A * | 10/1952 | Loock | 433/51 |
| 3,057,240 A * | 10/1962 | De Witt | 83/412 |
| 3,936,981 A | 2/1976 | White | |
| D244,938 S * | 7/1977 | Viazzoli | D24/176 |
| 4,074,436 A | 2/1978 | Marshall | |
| 4,182,615 A | 1/1980 | Weissman | |
| 4,567,802 A * | 2/1986 | Witherspoon | 83/581 |
| 4,625,611 A * | 12/1986 | Bauman | 83/861 |
| 4,815,350 A * | 3/1989 | Faig | 83/463 |
| 4,817,839 A | 4/1989 | Weissman | |
| 6,619,959 B2 | 9/2003 | Iiyama et al. | |
| 6,974,323 B2 | 12/2005 | Weigl et al. | |
| 7,059,231 B2 | 6/2006 | Graham | |
| 2011/0106019 A1* | 5/2011 | Bagwell et al. | 604/267 |

\* cited by examiner

Primary Examiner — Ghassem Alie

(57) ABSTRACT

A dental prosthesis mold shaping apparatus includes a panel that has an upper side and a cutting assembly that is attached to the panel and extends upwardly from the upper side. The cutting assembly is capable of cutting into a dental prosthesis mold. The cutting assembly has restricted lateral movement and unrestricted vertical movement. A saddle includes an mount and a plate. The mount is releasably coupled to the upper side and the plate releasably receives the dental prosthesis mold. The saddle supports the dental prosthesis mold while the dental prosthesis mold is being cut.

6 Claims, 6 Drawing Sheets

DENTAL PROSTHESIS MOLD SHAPING APPARATUS

BACKGROUND OF THE DISCLOSURE

Field of the Disclosure

The disclosure relates to dental prosthesis mold cutting devices and more particularly pertains to a new dental prosthesis mold cutting device for assisting a person in making precise cuts into a dental prosthesis mold.

SUMMARY OF THE DISCLOSURE

An embodiment of the disclosure meets the needs presented above by generally comprising a panel that has an upper side and a cutting assembly that is attached to the panel and extends upwardly from the upper side. The cutting assembly is configured to cut into a dental prosthesis mold. The cutting assembly has restricted lateral movement and unrestricted vertical movement. A saddle includes a mount and a plate. The mount is releasably coupled to the upper side and the plate is configured to releasably receive the dental prosthesis mold. The saddle is configured to support the dental prosthesis mold while the dental prosthesis mold is being cut.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
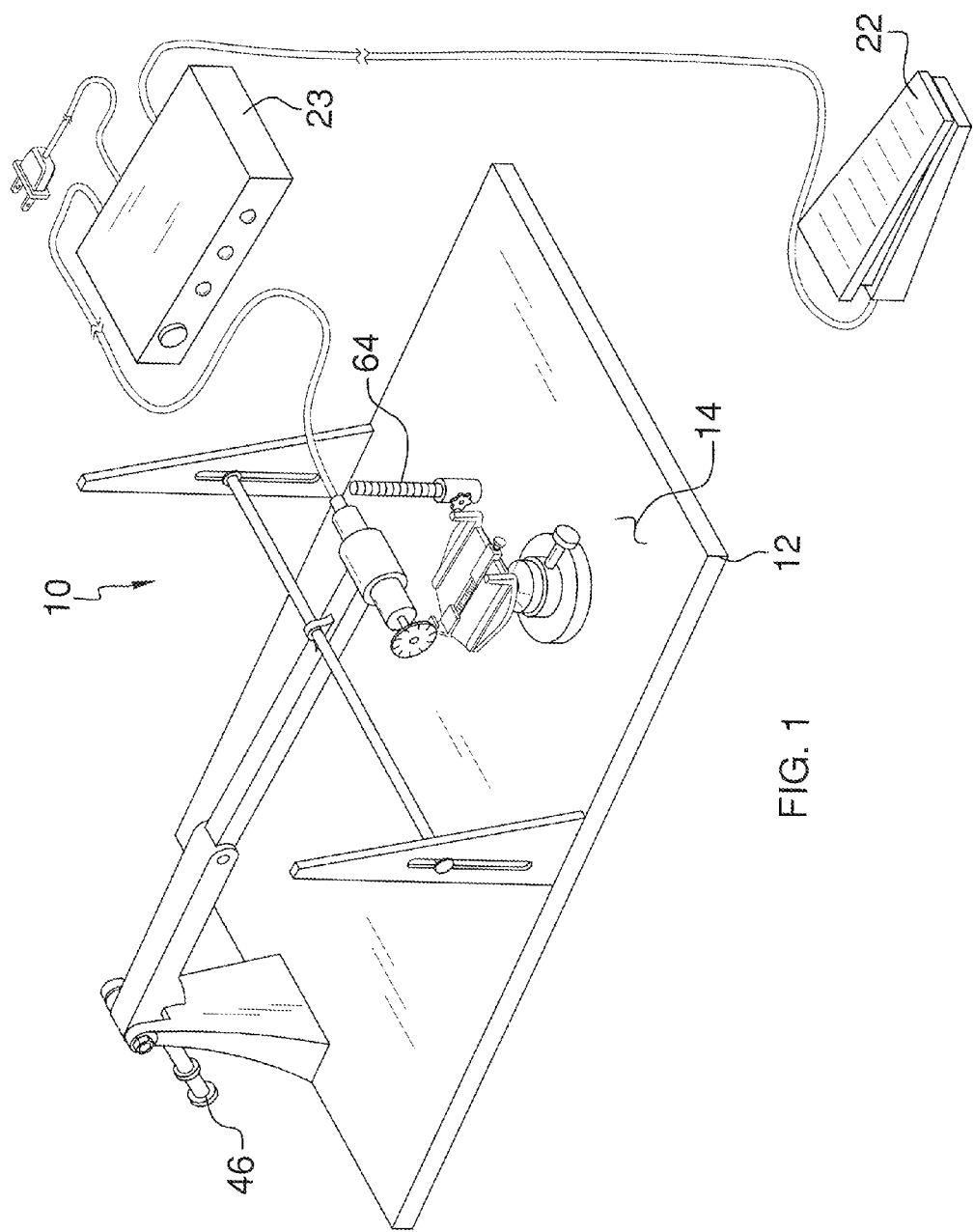
FIG. 1 is a top perspective view of a dental prosthesis mold shaping apparatus according to an embodiment of the disclosure.
Figure 2:
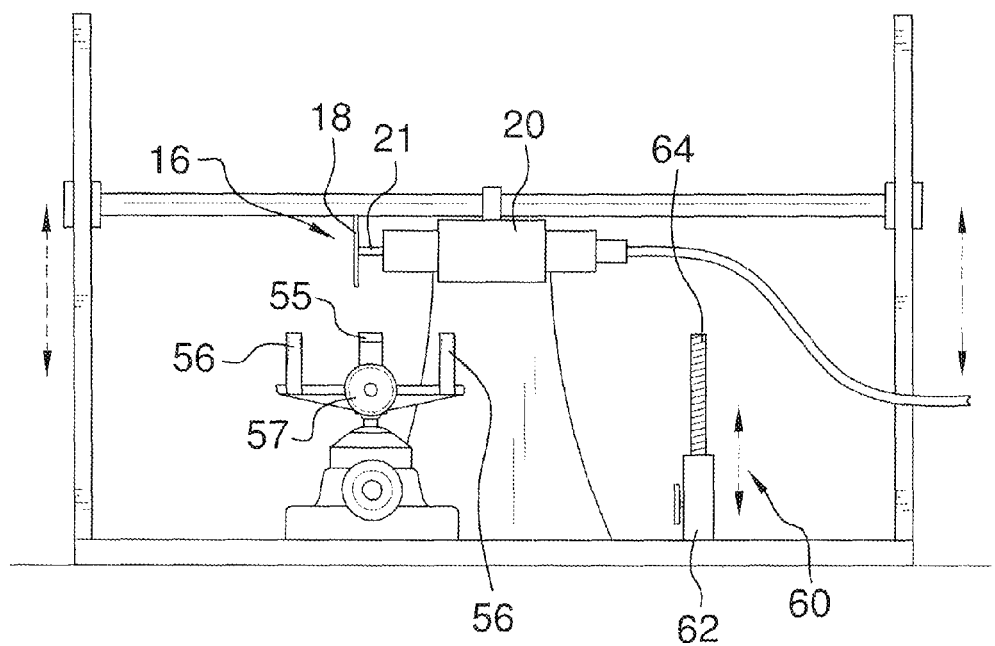
FIG. 2 is a front view of an embodiment of the disclosure.
Figure 3:
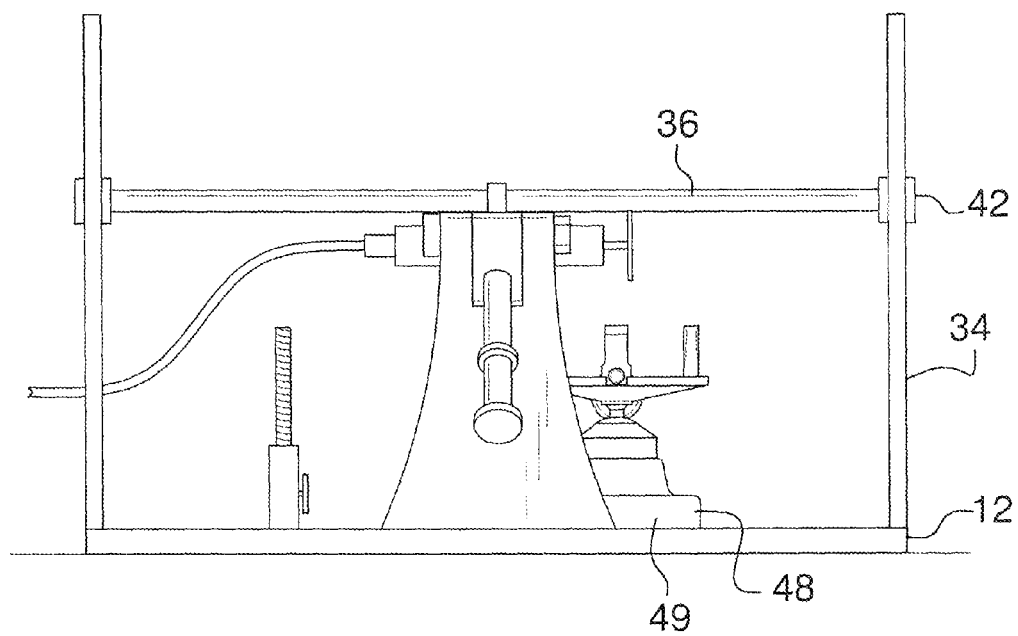
FIG. 3 is a rear view of an embodiment of the disclosure.
Figure 4:
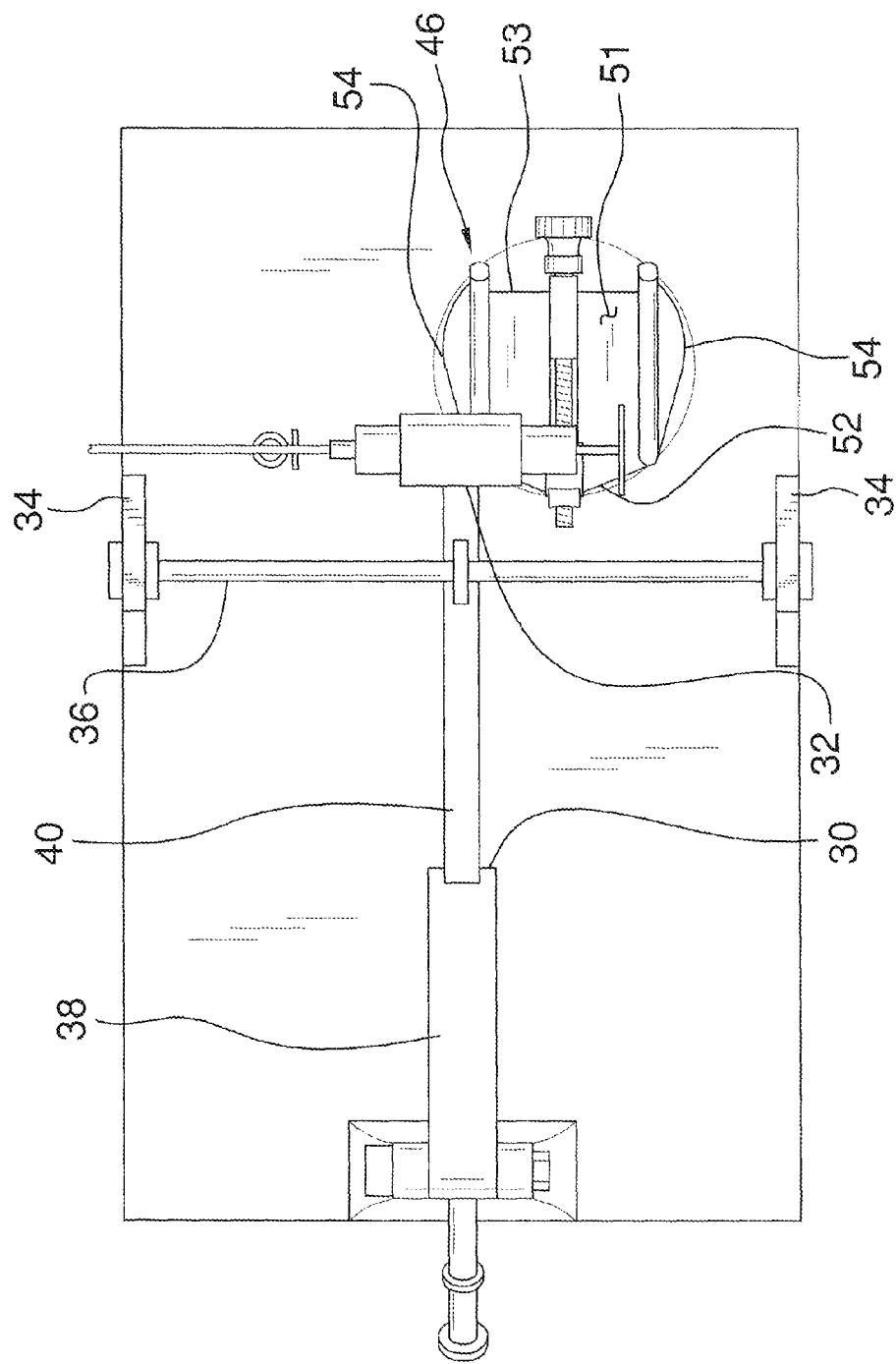
FIG. 4 is a top view of an embodiment of the disclosure.
Figure 5:
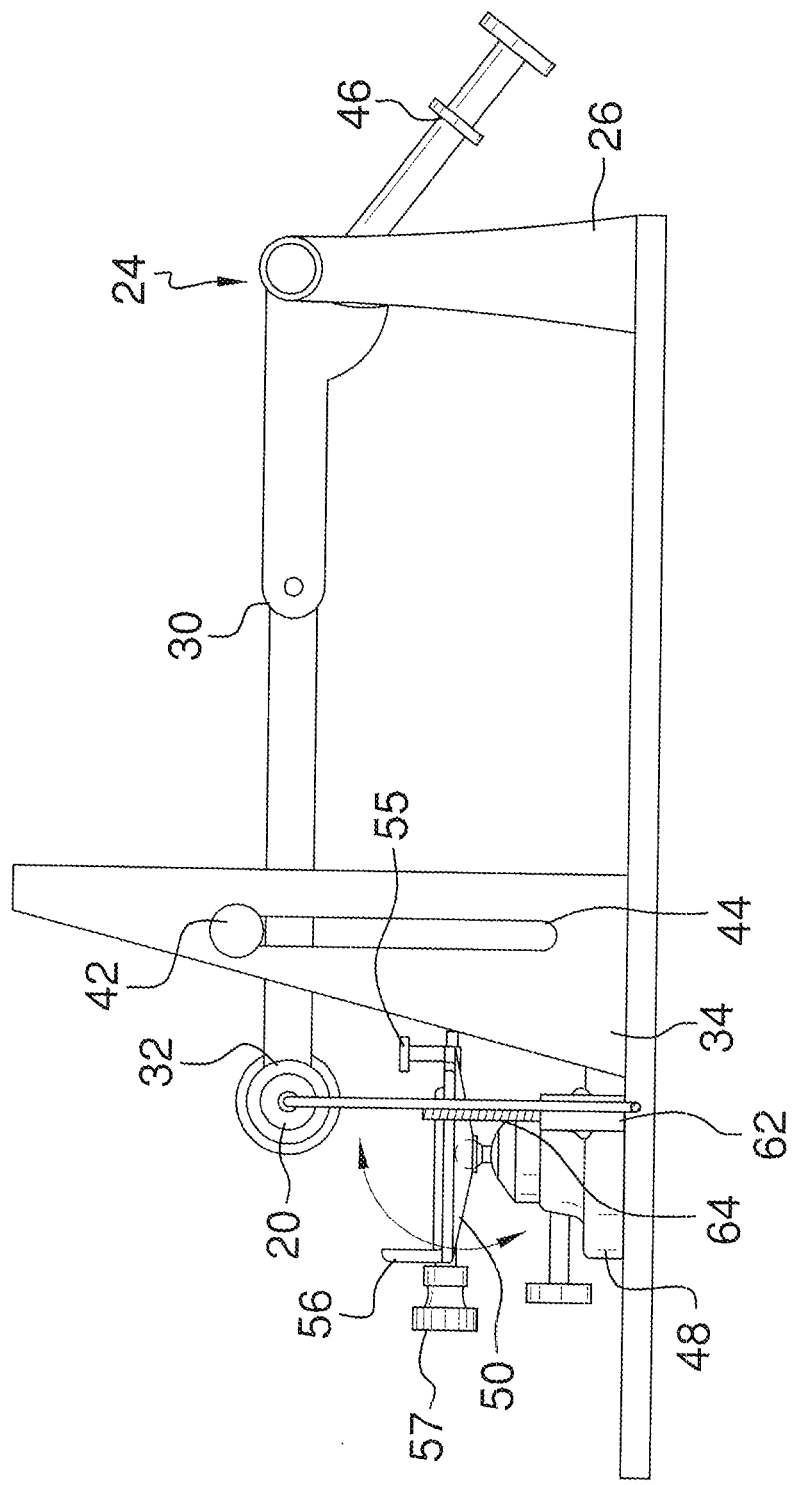
FIG. 5 is a side view of an embodiment of the disclosure.

With reference now to the drawings, and in particular to FIGS. 1 through 6 thereof, a new dental prosthesis mold cutting device embodying the principles and concepts of an embodiment of the disclosure and generally designated by the reference numeral 10 will be described.

As best illustrated in FIGS. 1 through 6, the dental prosthesis mold shaping apparatus 10 generally comprises a panel 12 that has an upper side 14. The panel 12 may include a conventional countertop, tabletop or the like.

A cutting assembly 16 is attached to the panel 12 and extends upwardly from the upper side 14. The cutting assembly 16 is configured to cut into a conventional dental prosthesis mold 70. The cutting assembly 16 comprises a saw assembly having a disc shaped blade 18 attached thereto. More particularly, the saw assembly 10 includes an electric motor 20 driving a mandrel 21 to which the disc shaped blade 18 is attached. The disc 18 is a conventional bladed, cutting disc utilized for cutting plaster such as is available from Renfert USA, 3718 Illinois Avenue, St. Charles Ill., 60174. The motor 20 is actuated with a foot pedal 22 and a modulator 23 may be utilized to better control the amount of power provided to the motor 20.

A support 24 is attached to the saw assembly 16 and supports the saw assembly 16 above the upper side 14. The support 24 is configured to allow vertical movement of the saw assembly 16 with respect to the upper side 14 and restrict lateral movement of the saw assembly 16. The support 24 retains the disc 18 in a plane oriented perpendicular to a plane of the upper side 14. The support 24 includes a base 26 that is attached to the panel 12 and an arm 30 that is pivotally coupled to the base 26. The arm 30 has a distal end 32 with respect to the base 26 and the saw assembly 16 is attached to the distal end 32. A pair of lateral buttresses 34 is attached to the panel 12 and the arm 30 is positioned between the lateral buttresses 34. A rod 36 is coupled to each of the lateral buttresses 34 and is vertically slidable on each of the lateral buttresses 34. The rod 36 is attached to the arm 30. The arm 30 may include a pair of sections 38, 40 pivotally coupled together to allow for a distance between the distal end 32 and the base 26 to vary as the distal end 32 is vertically manipulated. In particular, the rod 36 may include a pair of ends each comprising a hub 42 positioned within vertical slots 44 in the lateral buttresses 34. The hubs 42 are allowed to move upwardly and downwardly within the slots 44. Additionally, a tensioning handle 46 may be utilized and coupled to the arm 30 and the base 26 to adjust the ease of movement of the arm 30 relative to the base 26.

A saddle 46 for receiving the mold 70 includes a mount 48 and a plate 50. The mount 48 is releasably coupled to the upper side 14. The plate 50 is configured to releasably receive the dental prosthesis mold 70. The mount 48 comprises a conventional suction cup 49 releasably engaging the upper side 14. The plate 50 has a top side 51, a front edge 52, a rear edge 53 and a pair of side edges 54. A front bracket 55 is attached to and extends upwardly from the plate 50 adjacent to the front edge 52 and a rear bracket 56 is attached to and extends upwardly from the plate 50 adjacent to the rear edge 53. A distance between the front 55 and rear 56 brackets is adjustable to frictionally engage the dental prosthesis mold 70. In particular, the front 55 and/or rear 56 brackets are threadably coupled to the plate 50 to allow them to be moved by actuating a head 57 of a threaded member to urge the front 55 and rear 56 brackets toward each other and engage the mold 70. The plate 50 may be pivotable with respect to the mount 48.

A stop 60 may be attached to the panel 12 to restrict vertical movement of the cutting assembly 16. The stop 60 has a selectively adjustable height. In particular, the stop 60 may include a cylinder 62 and a post 64 threadably engaged to the cylinder 62. The post 64 is raised or lowered as needed to engage the rod at a height a user of the apparatus 10 does not want the rod 36 to move lower than. In this manner, the stop 60 prevents the accidental deep cutting into the mold 70 by the cutting assembly 16.

Figure 6:
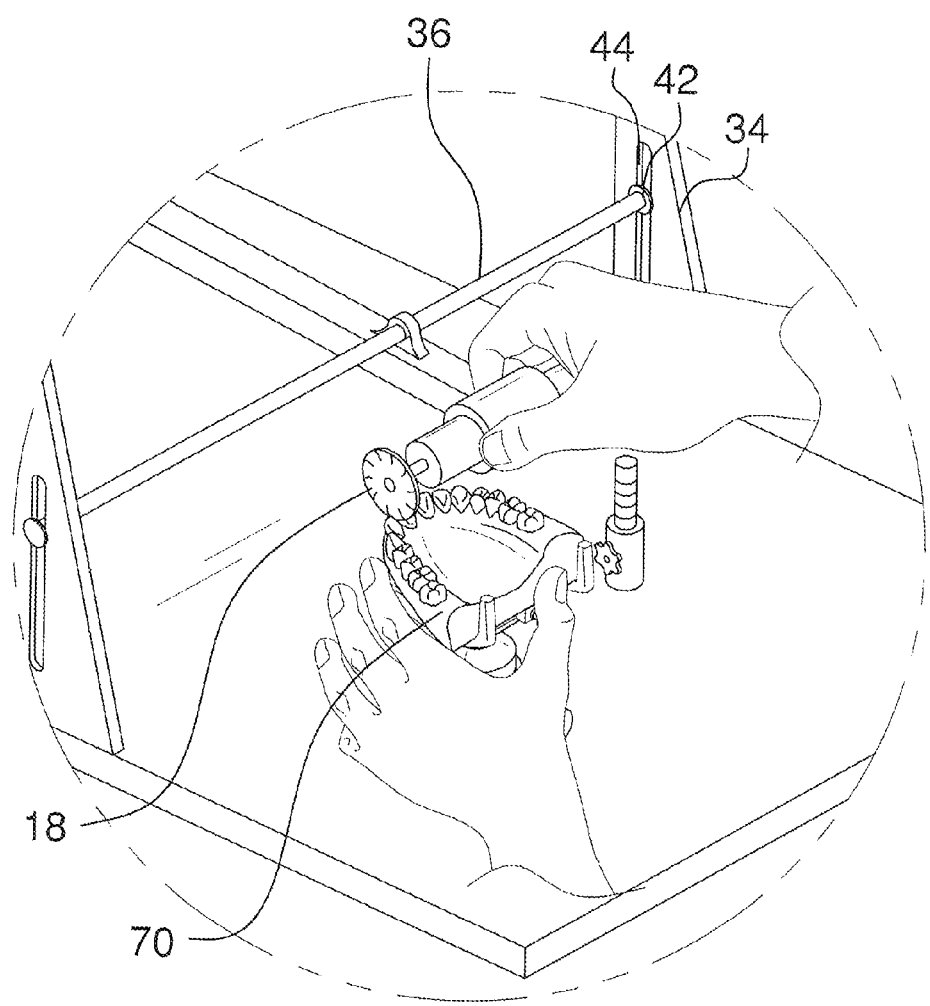
FIG. 6 is a perspective in-use view of an embodiment of the disclosure.

In use, the mold 70 is placed in the saddle as is shown in FIG. 6 and is frictionally held in place as described above utilizing the front 55 and rear 56 brackets. The stop 60 may be positioned at a selected height as needed. The cutting assembly 16 is then used to make detailed cuts to the mold as needed to prepare it for use in making a dental prosthesis. The apparatus 10 ensures that fine, detailed cuts can be made with less risk of cutting too deep or laterally of the intended position of the desired cut.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A dental prosthesis mold cutting apparatus for cutting a dental prosthesis mold, said apparatus comprising:
   a panel having an upper side;
   a cutting assembly being attached to said panel and extending upwardly from said upper side, said cutting assembly being configured to cut into a dental prosthesis mold, said cutting assembly having restricted lateral movement and unrestricted vertical movement, said cutting assembly including;
   a disc shaped blade; and
   a support being attached to said blade and supporting said blade above said upper side, said support being configured to allow vertical movement of said blade with respect to said upper side and restrict lateral movement of said blade, said support including;
   a base being attached to said panel;
   an arm being pivotally coupled to said base, said arm having a distal end with respect to said base, said blade being attached to said distal end, said arm including a pair of sections pivotally coupled together to allow for a distance between said distal end and said base to vary as said distal end is vertically manipulated;
   a pair of lateral buttresses being attached to said panel, said arm being positioned between said lateral buttresses; and
   a rod being coupled to each of said lateral buttresses, said rod being vertically slidable on each of said lateral buttresses, said rod being attached to said arm;
   a saddle including a mount and a plate, said mount being releasably coupled to said upper side, said plate being configured to releasably receive the dental prosthesis mold; and
   wherein said saddle is configured to support the dental prosthesis mold while the dental prosthesis mold is being cut.

2. The apparatus as in claim 1, wherein said mount comprises a suction cup releasably engaging said upper side.

3. The apparatus as in claim 2, wherein said plate has a top side, a front edge, a rear edge and a pair of side edges, a front bracket being attached to and extending upwardly from said plate adjacent to said front edge, a rear bracket being attached to said and extending upwardly from said plate adjacent to said rear edge, a distance between said front and rear brackets being adjustable to frictionally engage the dental prosthesis mold.

4. The apparatus as in claim 1, wherein said plate has a top side, a front edge, a rear edge and a pair of side edges, a front bracket being attached to and extending upwardly from said plate adjacent to said front edge, a rear bracket being attached to said and extending upwardly from said plate adjacent to said rear edge, a distance between said front and rear brackets being adjustable to frictionally engage the dental prosthesis mold.

5. The apparatus as in claim 1, further including a stop being attached to said panel and restricting vertical movement of said cutting assembly, said stop having a selectively adjustable height.

6. A dental prosthesis mold cutting apparatus for cutting a dental prosthesis mold, said apparatus comprising:
   a panel having an upper side;
   a cutting assembly being attached to said panel and extending upwardly from said upper side, said cutting assembly being configured to cut into a dental prosthesis mold, said cutting assembly including;
   a disc shaped blade;
   a support being attached to said blade and supporting said blade above said upper side, said support being configured to allow vertical movement of said blade with respect to said upper side and restrict lateral movement of said blade, said support retaining said disc in a plane oriented perpendicular to a plane of said upper side, said support including;
   a base being attached to said panel;
   an arm being pivotally coupled to said base, said arm having a distal end with respect to said base, said blade being attached to said distal end, said arm including a pair of sections pivotally coupled together to allow for a distance between said distal end and said base to vary as said distal end is vertically manipulated;
   a pair of lateral buttresses being attached to said panel, said arm being positioned between said lateral buttresses;
   a rod being coupled to each of said lateral buttresses, said rod being vertically slidable on each of said lateral buttresses, said rod being attached to said arm;
   a saddle including a mount and a plate, said mount being releasably coupled to said upper side, said plate being configured to releasably receive the dental prosthesis mold, said mount comprising a suction cup releasably engaging said upper side, said plate having a top side, a front edge, a rear edge and a pair of side edges, a front bracket being attached to and extending upwardly from said plate adjacent to said front edge, a rear bracket being attached to said and extending upwardly from said plate adjacent to said rear edge, a distance between said front and rear brackets being adjustable to frictionally engage the dental prosthesis mold; and
   a stop being attached to said panel and restricting vertical movement of said cutting assembly, said stop having a selectively adjustable height.

* * * * *